July 26, 1960 T. A. INSOLIO ET AL 2,946,460
PACK HANDLING DEVICE
Filed May 28, 1957 7 Sheets-Sheet 1

INVENTORS.
Thomas A. Insolio
Reno Carini
Peter J. Magrini, Sr.

BY Webb, Mackey & Burden
THEIR ATTORNEYS

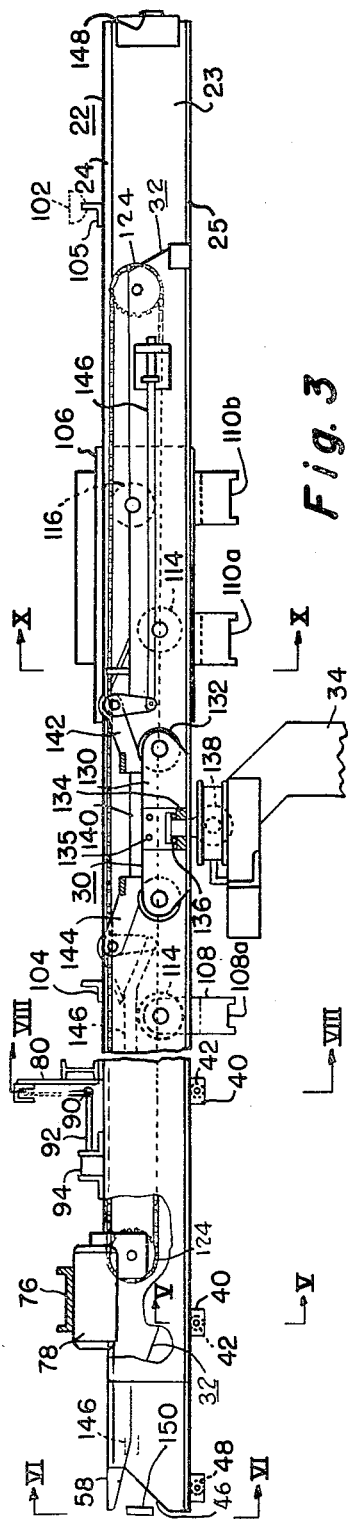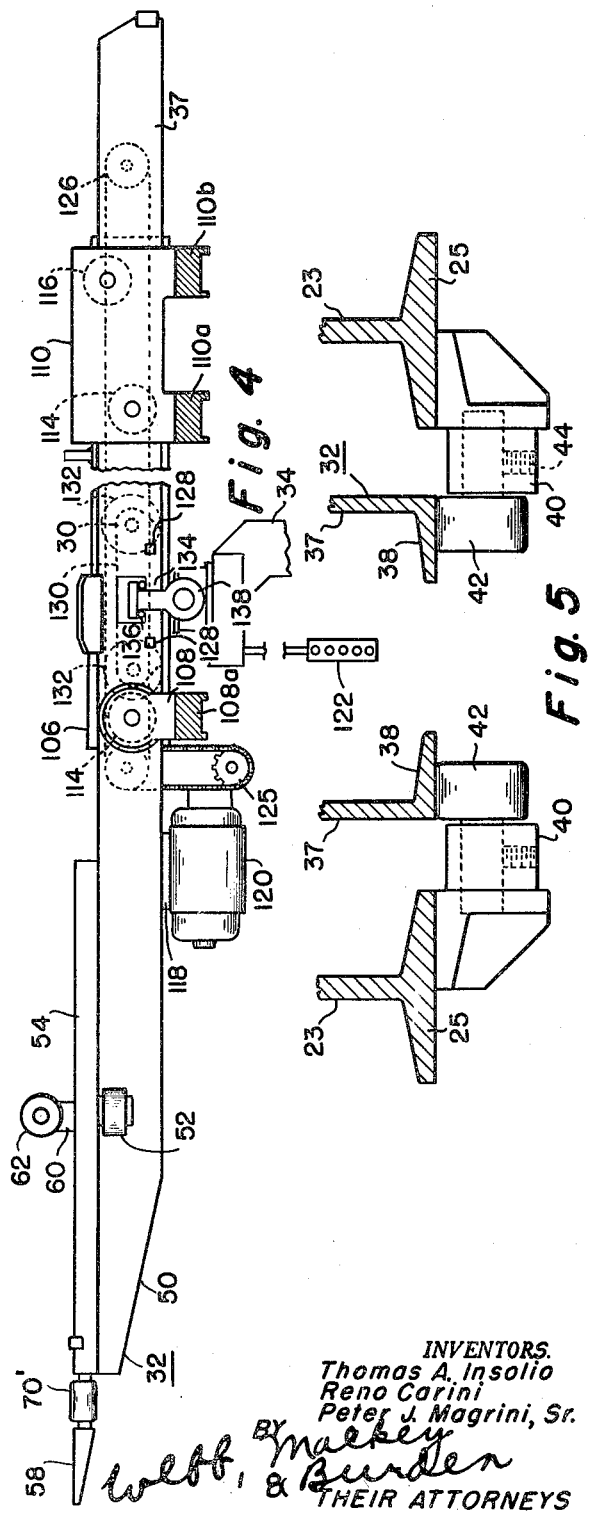

INVENTORS.
Thomas A. Insolio
Reno Carini
Peter J. Magrini
BY Webb, Mackey & Burden
THEIR ATTORNEYS INVENTORS.
Thomas A. Insolio
Reno Carini
Peter J. Magrini, Sr.
BY Webb, Mackey & Burden
THEIR ATTORNEYS

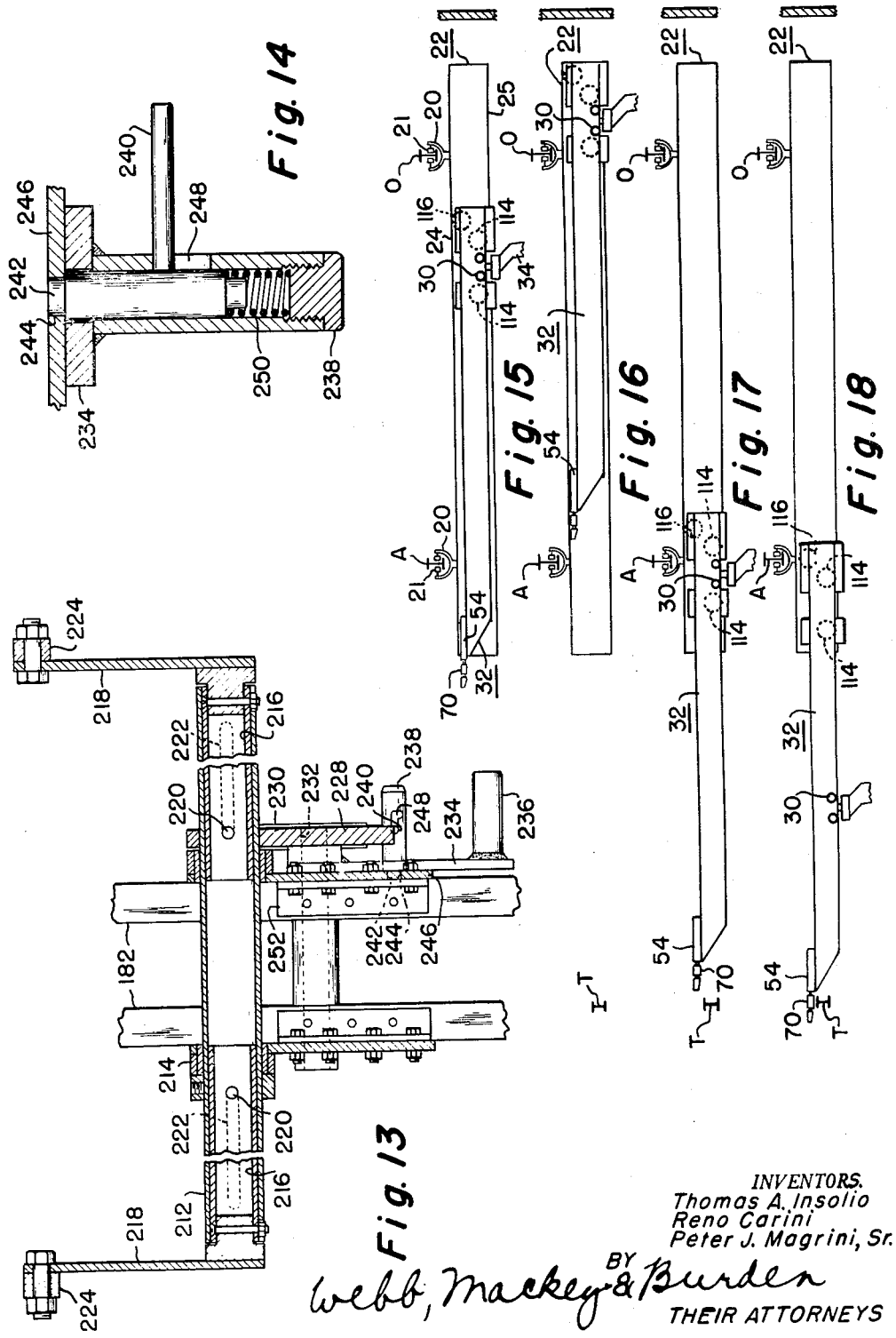

United States Patent Office 2,946,460
Patented July 26, 1960

2,946,460

PACK HANDLING DEVICE

Thomas A. Insolio, Jeannette, Pa., and Reno Carini and Peter J. Magrini, Sr., Okmulgee, Okla., assignors to American Window Glass Company, Pittsburgh, Pa., a corporation of Pennsylvania Filed May 28, 1957, Ser. No. 662,148

9 Claims. (Cl. 212—10)

This invention relates to a device for handling packs of sheet material and similarly stacked or packed articles in general, but in particular it relates to a handling device primarily for hoisting and conveying packs of sheet glass stacked on one edge. Essentially, a traversing crane is the basic structure which is here employed having an extensible boom and a suspended carrier thereon for hoisting and handling the glass packs.

There are many conditions in which it would be a marked advantage to have a suspended endwise extensible crane which can be moved so as to traverse sidewise even when extended. An example is a glass plant building installation in which the overhead suspending rails that are provided for the crane structure are disposed in an area in the building at one side of a row of intermediate roof supporting pillars beyond which glass cutting cells or other bays in that building are located. The crane operator is presented with a definite problem in moving the crane endwise to deposit a first sheet glass pack in one cutting cell, in further moving to another point in that cell to pick up a second glass pack, then moving it endwise from that cell to remove the second glass pack in a path between pillars in the row, and finally discharging the second glass pack at some other place, such as another bay.

Crane structure of the general type in prior use contemplates a series of overhead longitudinal rails for supporting the structure and includes bridge rail and boom rail components which carry rollers to roll along the different rails and provide for effective movement sidewise as well as endwise. To eliminate the disadvantage of extending and then leaving the boom rail component suspended in cantilever fashion from one end only, the operator must precisely register the opposite end of the boom to lock upon a remote support or rail extension aligned end to end therewith when it reaches its fully extended position. The difficulty with the locking of the boom in the prior type of structure noted is that each time the operator does so, he limits the scope of operations to one vertical plane with no latitude for sidewise adjustment out of that plane.

The present invention eliminates the foregoing difficulty, having the operating characteristics and mobility necessary for the marked advantage already indicated with having extensible crane structure which can traverse sidewise as desired even when extended. More specifically, the instant crane structure has an end extension or boom which carries a load supporting trolley between its ends in the usual way, but one of these ends has a permanent but shiftable connection to the crane in order for the other end to extend with the proper stability therefrom in the desired direction. To avoid cantilevered loads when the trolley rolls, that extensible end of the boom carries a pair of adjacent rollers arranged with mutually perpendicular fixed axes; one roller being provided for rolling along a third rail disposed parallel to the crane rails, but on the opposite side of the row of roof supporting pillars indicated to support the boom in its extended position, and the other roller for rolling endwise into engagement with the crane as soon as the boom retracts from its cantilevered position and telescopes thereinto. A very satisfactory pack carrier is provided which depends from the trolley in load engaging position and is arranged with a carrying and hoisting mechanism to raise or to deposit glass packs below the points where the trolley stops. We provide a load carrying appendage and a novel clamping device on the carrier for securing the glass pack firmly thereto while in transit. A feature is that the pack carrier is designed to maintain the same angle whether loaded or empty when suspended. This angle matches the standard angle of inclination of stacked sheet glass.

As above indicated, this invention is primarily adapted to handle packs of sheet glass or plate glass, but the operating principles apply with equal advantage in handling sheets and packs in general, for example, plywood, composition, or metal plates or sheets.

Further features, objects, and advantages will either be specifically pointed out or become apparent when for a better understanding of the invention, reference is made to the accompanying drawings which show a preferred embodiment thereof and in which:

Figures 2 and 3 are side elevational views to the scale of Figure 1 and to an enlarged scale respectively;

Figure 4 is similar to Figure 3 but shows a modified form of the crane boom alone;

Figures 5 and 6 are cross sectional views taken along the respective lines V—V and VI—VI of Figure 3;

Figures 13 and 14 are sectional views taken along the respective lines XIII—XIII and XIV—XIV in Figure 11; and, Figures 15, 16, 17, and 18 are diagrammatic views showing a sequence of operations of the present invention.

Figure 1:
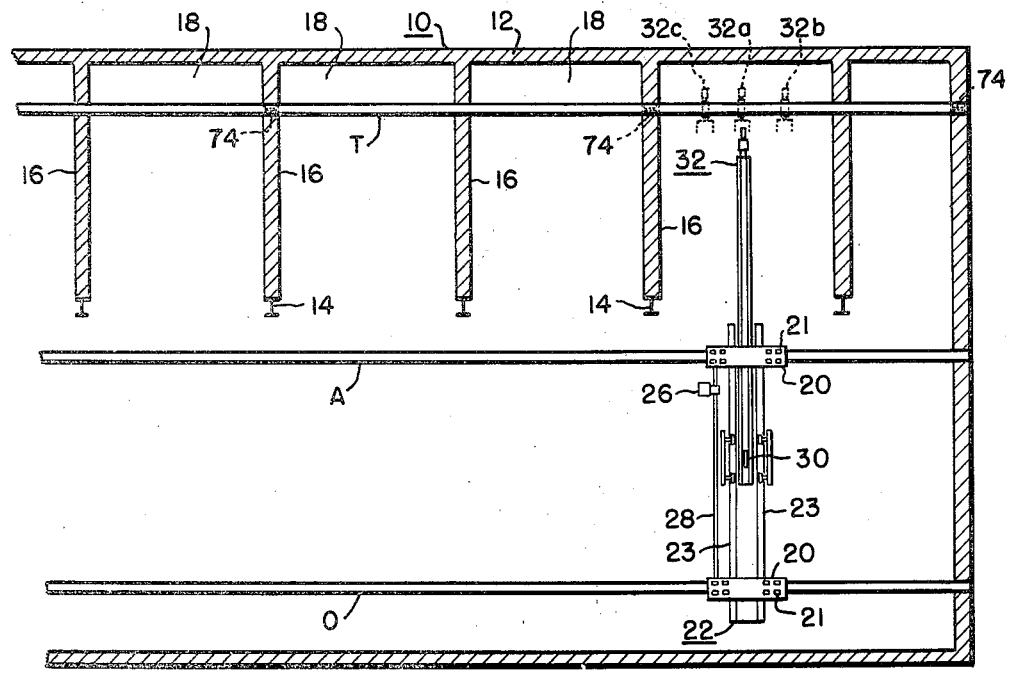
Figure 1 is a plan view of a suspended crane structure installed just beneath the roof of a building and embodying the present invention.
Figure 2:
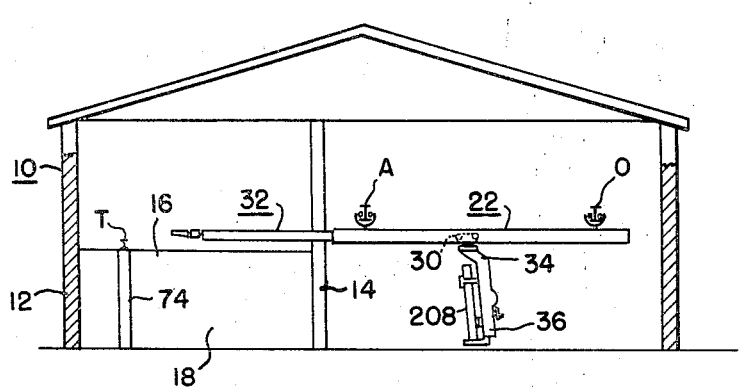

More particularly in Figures 1–10 of the drawings, we show one portion of a building 10 which is primarily adapted for use in sheet glass plants and which includes a lengthwise extending outside wall 12 having a parallel row of roof-supporting columns or pillars 14 spaced therefrom on the inner side of that wall. The wall 12 has a row of transverse interconnecting partitions 16 of intermediate height arranged between it and each of the pillars 14 to define a series of included cutting cells or bays 18. Properly supported by, but beneath the roof thereof, the building 10 has a longitudinally extending overhead rail system including a crane track at one side of the row of pillars 14 which is composed of a high rail A generally adjacent thereto and a companion outer rail O. On the opposite outer side of the row of pillars 14 the overhead rail system further includes a parallel third rail T disposed at a somewhat lower level than the crane track rails A and O, but sufficiently high for suspended crane structure to clear the tops of the cutting cell partitions 16.

A suspended sidewise movable crane structure includes spaced end trucks 20 carrying rollers 21 for rolling along the crane track rails O and A and further includes a unitary bridge member 22 formed of spaced parallel I-beams 23 secured at their opposite ends to the end trucks 20 and providing trackways at the top and bottom of the bridge defined by the upper and lower rails 24 and 25 of the I-beams. One of the end trucks 20 carries a crane drive motor 26 which through the usual traction wheel and driving axle assembly 28 provides an electrically controlled drive to move the crane structure sidewise along the crane track rails A and O.

In the space between the I-beams 23 thereof, the bridge member 22 includes a trolley element 30, plus a boom element 32 for carrying the same and being itself carried for telescoping movement in the bridge member 22. A depending pack carrier which is suspended from the trolley element 30 by means of a swivel connection hereinafter described for turning about a vertical axis, consists essentially of a hoisting head 34 which carries a load engaging appendage 36.

In Figure 5 the boom element 32 comprises two parallel rails 37 of channel cross-section which are rigidly secured together at their ends only in spaced face to face relationship so as to define an included trolley trackway 38 on the lower flanges thereof. At spaced points along the lower rails 25 thereof, the bridge I-beams 23 are provided with roller support brackets 40 welded thereto which carry rollers 42 for rotation on a fixed axis. The boom element rails 37 run on these rollers 42 which are adjusted axially and locked into transverse alignment with the rails 37 by means of a set screw adjustment 44 in the brackets 40.

Figure 6:
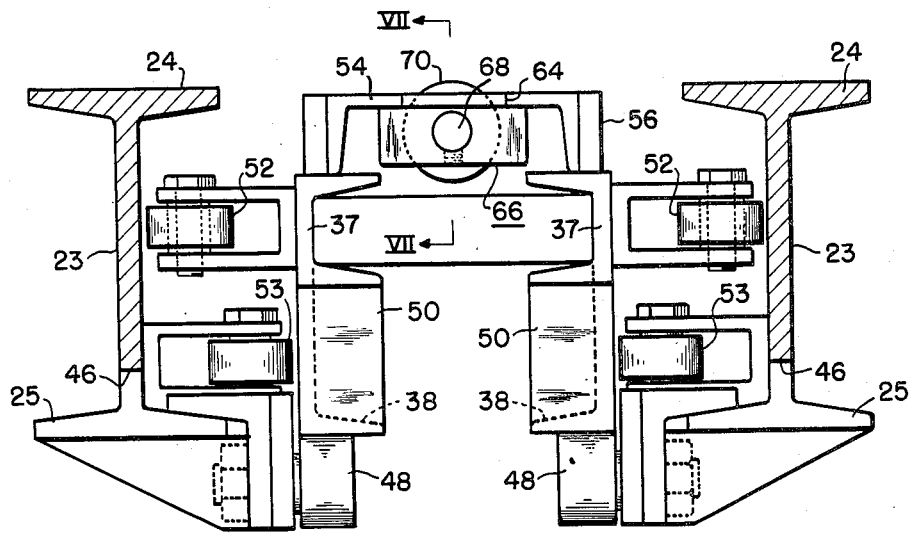

In Figures 3 and 6, the I-beams 23 are relieved at one end to give them a ramp shaped extremity 46 and adjacent this extremity they carry a set of fixed end rollers 48 on which the boom element rails 37 run. The rails 37 have their lower flanges upset at the end to give them an upward taper so as to close off the trolley trackway 38 and at the same time they provide a ramp surface 50 for bringing that end into smooth engagement with the rollers carried by the lower rails 25 of the I-beams. This particular end of the boom element rails 37 carries two outwardly directed centering rollers 52 which cooperate in conjunction with two inwardly directed centering rollers 53 carried by the I-beams 23 to keep the boom element centered in the vertical plane of the bridge member 22. The boom element rails 37 carry an inverted channel shaped boom element extension 54 which is welded thereto on the tops of the rails between a pair of side plates 56 and which has a tapered outer extensible end 58.

In lieu of the fixed lower rollers 42 and 48 for supporting the end of the boom 32 when retracted, the boom extension 54 may be modified to carry rollers according to Figure 4. For this purpose a transversely extending bracket 60 secured to the top of the extension 54 carries a coaxial pair of spaced rollers 62 for rolling along the respective upper rails 24 of the I-beams at the head of the ramp-shaped extremity 46. The extension 54 also carries another roller 70 having a fixed longitudinally extending axis mutually perpendicular to the common axis of the coaxial rollers 62.

Figure 7:
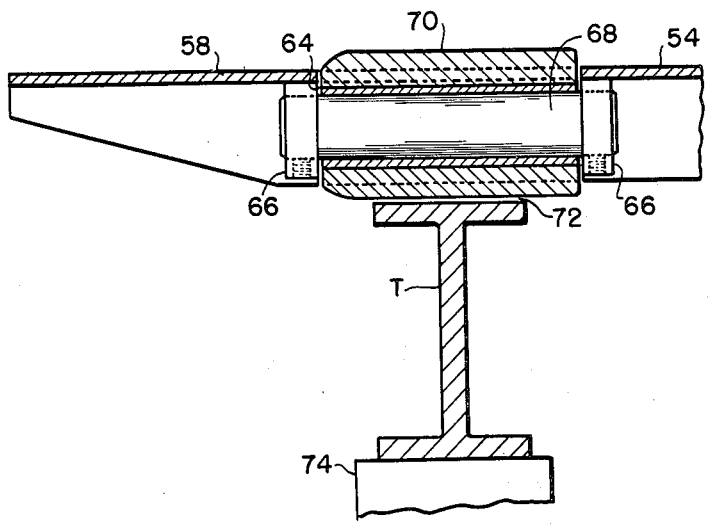
Figure 7 is a detail taken along the section lines VII—VII of Figure 6.

In Figures 6 and 7, the boom element extension 54 has a lengthwise extending slot 64 arranged with a depending pair of spaced apertured plates 66 welded in place at the opposite ends. A roller shaft 68 rigidly fixed at its opposite ends within the apertures in the plates 66 carries a roller 70. The roller 70 has an interface of rolling engagement 72 (Figure 7) for normally rolling along the third rail T but the design clearance provided at 72 is 1/4" to enable the roller 70 to move into its overriding position. The third rail T is supported upon several spaced vertical I-beams 74 within or adjacent the building walls and partitions 16 and thus rigidly supports the outer end of the boom 32 enabling it to roll freely on the roller 70 between the dotted line positions 32a, 32b, 32c (Figure 1).

Figure 8:
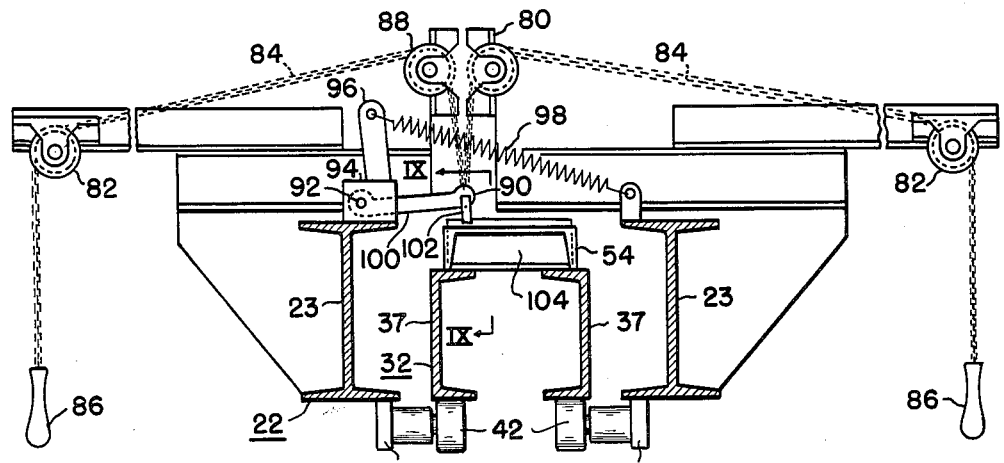
Figure 8 is a sectional view taken along the section lines VIII—VIII of Figure 3.
Figure 9:
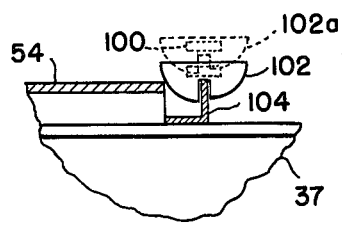
Figure 9 is a detail taken along the section lines IX—IX of Figure 8.

In Figures 3, 8, and 9, the I-beams 23 forming the bridge member 22 carry a boom latching frame 80 having a pair of transverse side arms each carrying a sheave 82 at the outer extremity thereof. A flexible connector 84 is passed along each arm of the frame 80 and carries a pull handle 86 at its outer end. Each connector 84 is trained over the sheave 82 and another sheave 88 at the head of the frame 80 from which it is passed down to a point of common connection to an unlatching lever 90. The lever 90 is fast to a lengthwise extending rockshaft 92 which is journaled in a bearing 94 carried by one of the I-beams 23. The rockshaft 92 carries another lever 96 biased by a latch return spring 98, and also a latch plate lever 100 carrying a latch plate 102. The latch plate 102 has a vertical slot through the lower edge in which it receives an angle-shaped striker plate 104 carried by the boom element rails 37 adjacent their juncture with the boom element extension 54. Pulling of either handle 86 on the appropriate connector 84 overcomes the return spring 98 so as to rock the rock-shaft 92 and pull the latch plate 102 upwardly into the dotted line unlatched position shown by the dotted lines 102a in Figure 9. At this point the boom element is free to roll lengthwise along the bridge member 22. A similar striker plate 105 (Figure 3) is provided at the opposite end of the boom element rails 37 so as to latch with the plate 102 when the boom element is in its extended position with reference to the bridge member 22.

In lieu of the boom latching frame 80 which could be used to stop and latch the boom when being manually moved, we also provide and can use for that purpose, a motor 78 in Figure 3 equipped with a worm gear drive and with limit switches (not shown) to move and accurately locate the boom 32. A motor support frame 76 bridging between the I-beams 23 suspends the motor 78 which through the worm gear drive (not shown) and a sprocket and endless chain connection 124 drives the boom 32 in conventional manner.

Figure 10:
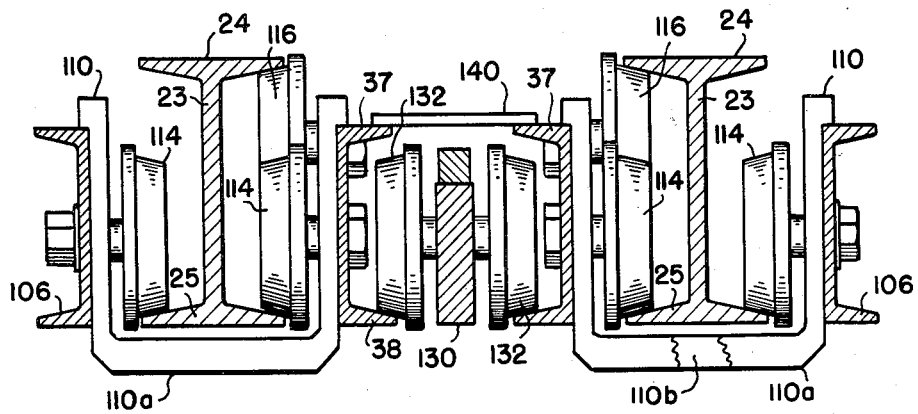
Figure 10 is a sectional view taken along the lines X—X of Figure 3.

On the opposite end from the extension 54, the boom element 32 according to Figures 3 and 10, has an end truck which includes a pair of spaced parallel side rails 106. The front end of the side rails 106 straddle and are secured to two transversely aligned brackets 108 which are welded at their inner ends to the boom element rails 37 and each of which includes an underslung bracket portion 108a. At the rear the side rails 106 straddle and are secured to two transversely aligned brackets 110 each having an underslung portion 110a and being secured at their inner ends to the boom element rails 37 in similar manner to the bracket 108 just discussed. Thus the underslung portions 108a and the underslung portions 110a (Figure 10) bridge between respective pairs of vertical bracket cheeks, the inner ones of each of which indicated at 112 have shoulder positively secured to the boom element rails 37. At points vertically above the underslung bracket portions 110a, the brackets 110 carry two pairs of transversely aligned rollers 114 to support the boom element rails 37 and the truck side rails 106 for rolling along the lower rails 25 of the I-beams 23. In a similar fashion the brackets 108 carry two more pairs of rollers 114. The bracket 110 has another underslung portion 110b at the rear which is secured so as to bridge between the bracket cheeks and which is vertically aligned with an upper roller 116 carried by each inner cheek for rolling along the underside of the upper rail 24 of the I-beams 23. The two upper rollers 116 prevent the end truck from tipping when the boom element 32 is extended in cantilever fashion from the end of the bridge 22.

In lieu of the hereinafter described trolley latches 142 and 144 of Figure 3, the trolley 30 may be operated according to the modification of Figure 4 through a trolley drive motor 120 and suitable limit switches (not shown) to locate its position as accurately as latches afford. More particularly in the modified showing of Figure 4, the boom element rails 37 carry a transverse motor mounting 118 which bridges therebetween and which supports a trolley drive motor 120. An electric control pendant 122 hanging from the hoisting head 34 of the pack carrier has switches controlling the trolley drive motor 120 and the boom drive motor 78 in addition to controlling the crane drive motor 26. The motor 120 has an intermediate chain connection 125 with a main sprocket and endless chain drive 126 for moving the trolley element 30 (Figure 4). For this purpose a pair of transverse chain lugs 128 affixed to the chain is made fast to the truck body 130 of the trolley element 30.

In Figure 3, each end of the trolley truck body 130 carries a pair of spaced coaxial rollers 132 for rolling along the trolley trackway 38 defined by the boom rail 37. The midportion of the truck body 130 is relieved so as to carry a bottom cross plate 134 which is suspended from the bottom edges of a pair of bracket side plates 135 rigid with the trolley truck body 130. The cross plate 134 supports a thrust bearing 136 and has a coaxial aperture which in conjunction therewith swivelly supports the shank of an eye bolt 138 for carrying the pack carrier for turning movement about a vertical swivel connection axis. The truck body 130 for the trolley element 30 carries a striker plate 140 across the top which engages the opposite pivoted latch fingers 142 and 144 of a spring latch straddling the same and mounted to the rails 37 of the boom element 32. Each of the rails 37 further carries a longitudinally slidable push rod 146 (Figure 3) which at their outer ends engage fixed transverse tripping straps 148, 150 respectively carried by the bridge 22 and by a fixed member at the opposite extremities of travel of the boom and which at their inner ends are connected to pivot latch fingers 142 or 144 out of the way as soon as the boom element assumes each extremity of its travel lengthwise of the bridge member 22.

Figure 11:
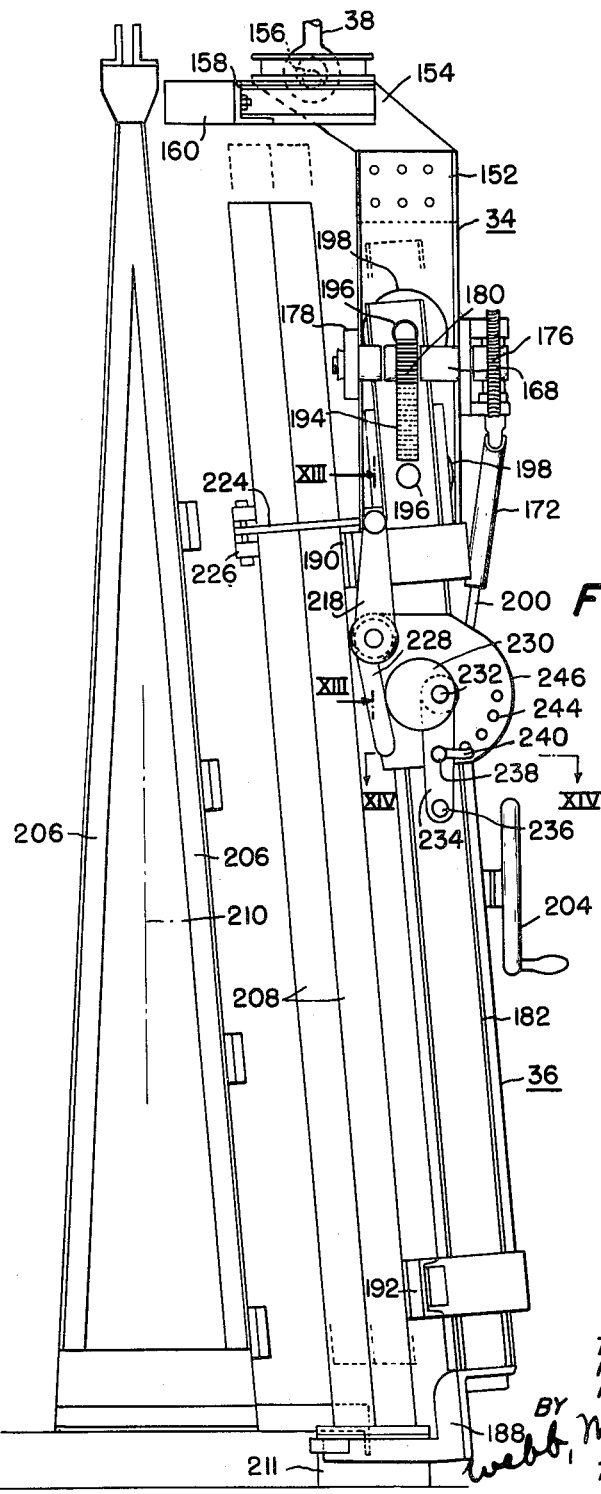
Figure 11 is similar to Figure 2 but shows the pack carrier to enlarged scale in side elevation.
Figure 12:
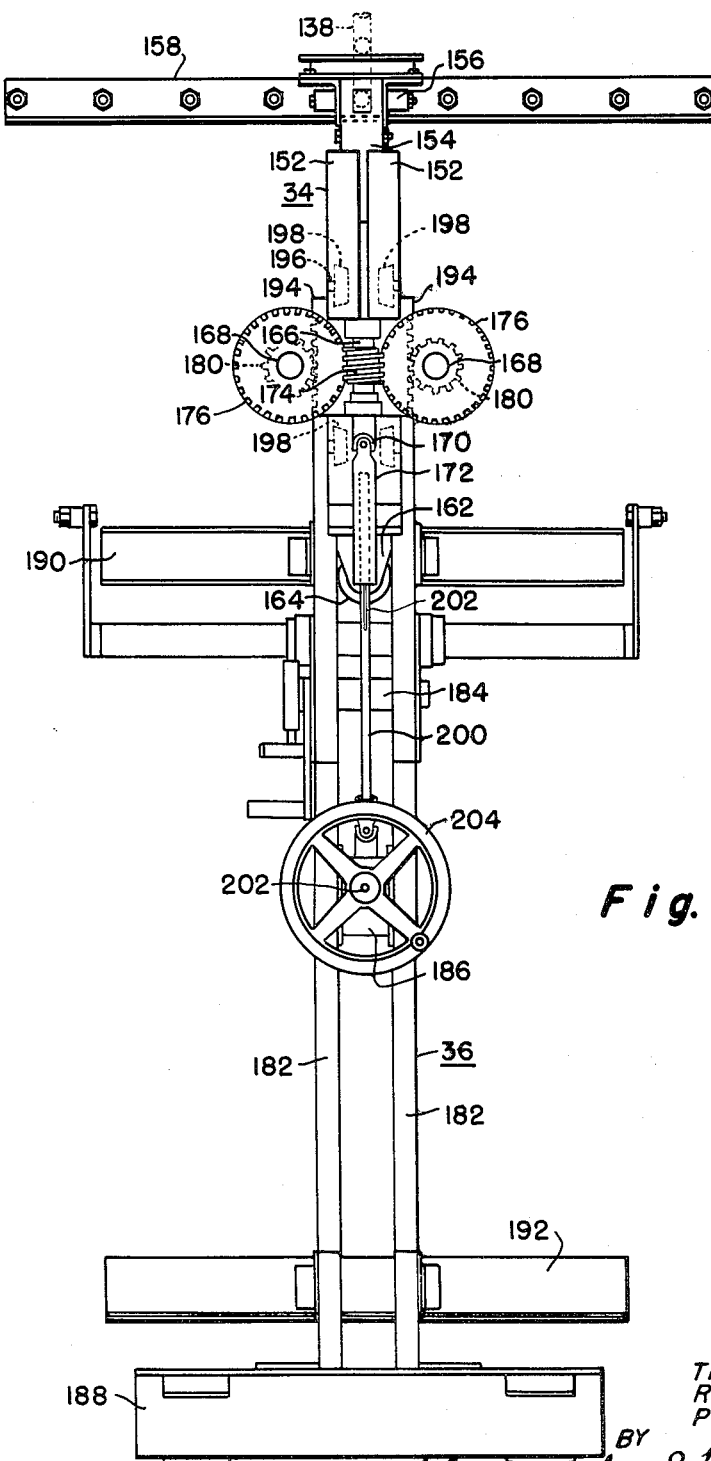
Figure 12 shows the pack carrier in front elevation.

In Figures 11 and 12 the hoisting head 34 on the pack carrier is vertically disposed comprising two outwardly facing channels 152 arranged back to back and rigidly connected together at their ends only by means of upper and lower connections. The upper connection, fixed between the channels 152, comprises a bracket 154 carrying a cross pin 156 which passes through the eye of the eye bolt 138 in a cooperative manner forming a universal joint swingably mounting the pack carrier. An angle iron cross piece 158 on the head 34 carries a lead counterweight 160 which in conjunction with other counterweights (not shown) makes the pack carrier hang in a position with the hoisting head 34 vertical at all times regardless of whether loaded or unloaded. The bottom connection fixing together the channels 152 comprises a bracket 162 which carries a centering roller 164.

The hoisting head 34 may be provided with a conventional tugger hoist for raising and lowering the hoist member 36, but preferably for that purpose we use a screw hoisting mechanism as illustrated in Figures 11 and 12. The hoisting head 34 carries that mechanism which includes a vertical shaft 166 set in bearings therein and straddled by a pair of horizontal spaced shafts 168. The vertical shaft 166 has a universal joint 170 at the lower end connecting it to an internally splined input sleeve 172. A worm 174 fast to the midportion of the vertical shaft 166 meshes with a pair of worm wheels 176 keyed to the respective horizontal shafts 168 at the front end. An individual bearing 178 on the hoisting head 34 supports each rear end of the shafts 168 which at the midportion carry separate rack pinions 180.

The load carrying appendage 36 forms the hoist member suspended from the pack carrier and comprises a substantially vertically disposed pair of outwardly facing channels 182 arranged back to back and rigidly connected together at three spaced points by means of an upper cross plate 184, a gear housing 186, and a rigid foot assembly 188 so as to provide a guideway of uniform width for running on the centering roller 164 carried by the hoisting head 34. The channels 182 carry fixed upper and lower wood bars 190 and 192 which connect them together at two more points and which are padded on the outside surface with appropriate material for engaging the glass pack. At the upper extremity each channel 182 carries an outwardly facing rack 194 each in constant mesh with the rack pinion 180 on the adjacent shaft 168. The three-point engagement which the centering roller 164 and the two rack pinions 180 on the hoisting head 34 establish with the load carrying appendage 36 affords to the racks 194 affixed thereto a desirable freedom to seek a neutral balanced position with the teeth in a load sharing relationship supporting the appendage 36. Each rack 194 is vertically disposed and in vertical alignment with the opposite ends thereof, each channel 182 carries spaced staggered cross shafts 196 on which a pair of tapered rollers 198 is journaled with slight offset to one another for rolling in the guideway formed by the opposed flanges of the outwardly facing vertical channels 152 in the hoisting head 34. Therefore, the rack 194 and the rollers 198 are parallel and travel in the guideway in vertical alignment with one another and at a slight angle to the length of the channels 182 which, whether loaded or unloaded, are maintained at pre-selected inclination at all times with reference to a vertical plane.

The gear housing 186 contains a pair of meshing bevel gears (not shown), one of which is fast to an upwardly extending drive shaft 200 having a single longitudinal spline and being telescopically received within the input sleeve 172 so as to form an extensible sliding joint connection to the worm 174 for driving the rack pinions 180. The other bevel wheel (not shown) is connected by a shaft 202 from within the gear box 186 to an electric drive motor if preferred or, as illustrated, to a hand wheel 204 carried by the channels 182 comprising the appendage 36. Rotation of the shaft 202 raises and lowers the appendage 36 on the hoisting head 34.

A typical glass supporting buck with which the pack carrier is adapted to cooperate comprises a pair of upwardly converging rigid A frames 206 which carry the glass packs 208 and which have the same selected degree of inclination to a vertical reference plane 210 as does the load carrying appendage 36 on the pack carrier. Each glass pack 208 rests on edge upon a low stool 211 formed of short spaced I-beams and adapted to be straddled by forked toe portions provided in conventional manner to the end of the foot assembly 188. A clamping means is provided on the pack carrier for clamping the pack 208 to the padded wooded cross bars 190 and 192 on the load carrying appendage 36.

The glass clamping means according to Figures 11, 13, and 14 has operating mechanism including a tubular assembly formed of an outer tube 212 journaled in aligned bearings 214 carried by the channels 182 and an inner tube 216 in each end of the outer tube 212 and rigidly carrying a swingably vertically extending lever arm 218. A cross pin 220 affixed to the inner end of each inner tube 216 slides in lengthwise extending pared slots 222 formed in the opposite ends of the outer tube so as to prevent relative rotation between the inner and outer tubes. The inner tubes 216 are axially shiftable toward and away from one another so as to adjust the effective length of the tubular assembly and thereby change the distance between the opposite arms 218 which they carry. This adjustment enables the arms 218 to fit glass packs of different widths. The upper end of each lever arm 218 pivotally carries a tie rod connector 224 which is pivotally connected to the adjacent opposite end of a horizontal clamping bar 226 for engaging the glass pack. The outer tube 212 rigidly carries a depending crank lever 228 having a cam surface for rocking the tube assembly which is engaged by an eccentric 230. The eccentric 230 is fast to a cross shaft 232 journaled to the channels 182 which carries a hand crank 234 rigid therewith and provided with a handle 236 at the end. The hand crank 234 carries a plunger latch 238 at its midportion which has an operating handle 240 and which has a plunger portion 242 at the inner end protruding through the crank midportion and engageable in selected openings 244 formed in a semi-circle in a stationary latch plate 246. The handle 240 is guided for movement in an L-shaped slot 248 in the case of the latch 238 which has a transverse part in which the handle can be lodged to hold the plunger portion 242 retracted but a biasing spring 250 is normally effective on the latch plunger so as to hold the protruding end 242 firmly in one of the openings 244. The latching plate 246 has a mounting bracket 252 rigidly mounting it to the adjacent channel 182. Release of the plunger latch by withdrawing the handle 240 enables an operator to apply pressure to move the handle 236 so as to rotate the eccentric 230 and change the tension in the tie rod connectors 224. In this fashion the glass pack 208 can be firmly secured under adequate tension to the load carrying appendage 36 on the pack carrier. Thereafter, the hand wheel 204 is rotated to raise and lower the appendage 36 in depositing and picking up glass packs 208 as required. No instability is encountered when the appendage engages or releases a load inasmuch as the channels 182 thereof have the same selected inclination to the vertical as the glass packs and due to the counterweights on the head 34 they retain this inclination whether unloaded or loaded.

A sequence of operation of the pack handling device of the preceding figures is best understood with reference to Figures 15, 16, 17, and 18. In Figure 15, the boom element 32 is shown in its normal or home position in which it is latched to the bridge 22 by means of the latch plate 102 (Figure 9). The trolley element 30 is shown in its normal or home position on the boom element 32 being latched to the same by means of the latch fingers 142 and 144 which straddle and latch it automatically (Figure 3). It is noted that in this position the trolley element 30 is approximately midway between the lower truck wheels 114 in the end truck for the boom element 32. In this fashion it moves with the boom element 32 which is shiftable to extend at each end beyond the outer rail O and the rail A respectively. Preliminary to moving it either way the operator grasps one of the hand pulls 86 (Figure 8) for releasing the latch plate 102 in the manner indicated in Figure 9.

Figure 16 shows the result of moving the trolley and boom elements 30, 32 together to the right such that the boom element occupies its storage position on the bridge member 22. In this position the plunger 146 (Figure 3) abuts the transverse tripping strap 148 so as to be shifted and raise the latch finger 142 enabling the trolley element 30 to continue movement farther to the right from the dotted line showing of Figure 16. Under conditions of movement of the boom element 32 to take either position just described, the lower rollers 42 and 48 (or the boom rollers 62 in the modification of Figure 4) and the truck rollers 114 are in continual rolling engagement with the tops of the respective I-beam rails 24 and 25. The boom element is thus firmly supported at both ends in either position of Figures 15 and 16 and also in the in-between positions moving from one such position to the other.

Figure 17 shows the boom element 32 in its temporary cantilevered position of movement between the home position of Figure 15 and its extreme extended position. In this case the trolley element 30 moves therewith, locked in position midway between the lower rollers 114. Thus the combined weights of the trolley and its load coupled with the pressure of mechanical engagement of the roller 116 on the underside of the upper I-beam rail 24 produces a counterbalancing moment at the inner end of the boom element 32 to give stability to the truck and help offset the dead weight of the outer end of the boom while extending in cantilever fashion at in-between positions of transition typified by Figure 17. This extending motion is perpendicular to the normal traversing motion of the crane structure and is confined to the included space between the respective levels of the outer rails T and O.

Figure 18 shows the boom element 32 in its fully extended position with the roller 70 on the boom element extension 54 being solidly engaged with the third rail T. The indicated design clearance of ¼" between the third rail T and the roller 70 thereabove is taken up immediately the trolley element 30 starts moving toward an unloading position whereby its weight imperceptibly tilts the boom element downwardly bringing the roller 70 on the boom extension 54 and the rail T into the desired load-sustaining rolling engagement together. This engagement makes it feasible thereafter for the trolley to move independently and for the bridge 22 to move sidewise with the trolley with assurance of solid support for the boom element 32 firmly at both its ends. Accordingly in this position the transverse strap 150 (Figure 3) has been engaged by the plunger so as to release the latch finger 144 (Figure 3) enabling the trolley element 30 to move independently in the same direction into the solid line position shown in Figure 18. In this ultimate position of Figure 18, which we believe to be entirely novel in its results, the interfitting bridge and boom elements 22, 32 form a transversely extended crane unit movably mounted at each end upon and between the vertically spaced planes of the outer ones O and T of the overhead rails. The inner end of the bridge element 22 retains its permanent connection for movement to the rail A of the overhead crane track whereas the rollers 114 and 116 on the boom element end truck continue to perform as a permanent shiftable connection between the inner ends of the bridge and boom elements 22 and 32. The solid connections thus afforded eliminate drawbacks attendant with use of cantilever type of support for a boom with the loaded trolley thereon, and yet they do not interfere with the full mobility illustrated in the dotted line showings 32a, 32b, and 32c of Figure 1.

It is to be further appreciated that the lower rollers 42 and 48 or the generally similar upper rollers 62 according to the modification of Figure 4 on the boom element extension 54 serve the purpose of insuring against cantilever stresses in the boom element when in the positions of Figures 15 and 16.

Variations within the spirit and scope of the invention described are equally comprehended by the foregoing description.

We claim:

1. A conveying and handling device comprising in combination, a plurality of longitudinal support members with at least one longitudinal member thereof arranged in spaced apart relation between others, first rollers, interfitting elements forming a transversely extended crane unit movably mounted by means of said first rollers at each end upon the outer ones of said longitudinal support members, said elements being telescopically related and having means comprising second rollers movably mounting the inner end of one of the elements to an inner one of the longitudinal members for supporting the unit to move therealong, and means effective both with said elements extended in the described manner or telescoped together for moving the transverse crane unit with respect to said plurality of longitudinal members and for effecting movement of the elements of said assembly into telescoped relationship.

2. A conveying and handling device comprising in combination, a plurality of longitudinal support members with at least one longitudinal member thereof arranged in spaced apart relation between others, interfitting elements forming a transversely extending crane unit carrying roller means at each end and movably mounted thereby at each end upon the outer ones of said longitudinal support members, said elements being telescopically related and having means movably mounting the inner end of one of said elements to an inner longitudinal member for supporting the unit to move therealong, a hoisting device permanently secured to the other element for limited shifting movement between the ends thereof and having a load engaging appendage, and powered means effective both with said elements extended or telescoped together for moving the transverse crane unit with respect to said plurality of longitudinal members, for effecting shifting movement of said hoisting device between points between the ends of said other element of said assembly, and for effecting movement of the elements of said assembly into telescoped relationship.

3. A conveying and handling device comprising in combination, a plurality of longitudinal support members with at least one longitudinal member thereof arranged in spaced apart relation between others, interfitting elements forming a transversely extended crane unit carrying rollers at each end and movably mounted thereby at each end for rolling movement upon the outer ones of said longitudinal support members, said elements being telescopically related and having means movably mounting the inner end of one of said elements to an inner longitudinal member for supporting the unit to move therealong, said other element having drive sprockets at the ends thereof and a hoisting device permanently secured to said other element for limited shifting movement between the drive sprockets at the aforesaid ends thereof, said hoisting device having a load engaging appendage movably mounted to the lower portion thereof, means to clamp a load to said load engaging appendage on the hoisting head, and powered means effective both with said elements extended or telescoped together for moving the transverse crane unit with respect to said plurality of longitudinal members, for effecting shifting movement of said hoisting device at points between the ends of said other element of said assembly, and for effecting movement of the elements of said assembly into telescoped relationship.

4. A conveying and handling device comprising in combination, a plurality of longitudinal support members with at least one longitudinal member thereof arranged in spaced apart relation between others, first rollers, interfitting elements forming a transversely extending crane unit movably mounted on said first rollers at each end upon the outer ones of said longitudinal support members, said outer rails being in planes at different levels with respect to one another, second rollers, said elements comprising bridge and extensible boom rails interconnected by said second rollers for telescoping together and having means movably mounting the inner end of the bridge rail element to an inner longitudinal member for supporting the unit to move therealong, and powered means effective both with said elements extended or telescoped together for moving the transverse crane unit with respect to said plurality of longitudinal members and for effecting movement of the boom rail element into the telescoped relationship, the just described respective paths of travel of said boom rail element being mutually perpendicular to one another and confined to the included space between the levels of the outer rails.

5. A device according to claim 4 wherein said boom rail carries both one of said first rollers and in addition a third roller at its end, which are respectively engageable with the top of said lower outer rail and with the top of said bridge element rail for rolling on the former in the extended position and for establishing a shiftable point of supporting contact between the latter and the boom rail in the telescoped position.

6. A conveying and handling device comprising a plurality of longitudinal support members with at least one longitudinal member thereof arranged in spaced apart relation between others, interfitting elements forming a transversely extended crane unit movably mounted at each end upon the outer ones of said longitudinal support members, said elements comprising bridge and extensible boom rails shiftably mounted for telescoping together and having means movably mounting the inner end of said bridge rail to an inner longitudinal member for supporting the unit to move therealong, a hoisting device permanently secured to the boom element rail for shifting movement between the ends thereof and having a load engaging appendage, said boom rail element carrying a pair of latch actuators extending in opposite directions and latch means disposed at a point therebetween in the path of travel of the shiftable hoisting device, said actuators being engageable at one extending end with stationary means, and at the other end with means on the bridge rail element to pivot the latch means out of the path of the hoisting device for movement independent of the boom rail element when the end of the latter reaches the corresponding end of the bridge rail, and means effective both with said elements extended or telescoped together for moving the transverse crane unit with respect to said plurality of longitudinal members, for effecting shifting movement of said hoisting device in locations between the ends of said boom rail element, and for effecting movement of the elements of said assembly into telescoped relationship.

7. Traversing crane structure comprising a plurality of longitudinal support members with at least one longitudinal member thereof arranged in spaced apart relation between others, interfitting elements forming a transversely extensible crane unit having rollers mounting each end upon the outer ones of said longitudinal support members for shifting movement therealong, said elements comprising bridge and extensible boom rails shiftably mounted for telescoping together, and having means movably mounting the inner end of the bridge rail element to an inner longitudinal member for supporting the unit to move therealong, a hoisting device permanently secured to the boom rail element for shifting movement between the ends thereof and having a load engaging appendage, said boom rail element carrying latch actuators extending lengthwise thereof in opposite directions and further carrying interposed latch means to hold the hoisting device in a fixed position between the actuators on the boom rail element when it moves in those directions, said latch actuators being engageable with fixed means at the ends of travel of the boom rail element to unlatch the hoisting device for independent movement thereof upon the boom rail element when either end of the latter reaches its corresponding end of travel, and means for effecting movement of the transverse crane unit with respect to said plurality of longitudinal members and for effecting shifting movement of said hoisting device at points between the ends of said boom rail element and for effecting movement of the elements of said unit into telescoped relationship.

8. For use in combination with a straight length of transversely disposed, boom supporting rail member, suspended, longitudinally extending crane structure including a boom truck carrying rollers for rolling endwise longitudinally thereof, a boom element having an end portion which, as said element extensibly longitudinally moves, overlaps with said transverse boom supporting member in solid physical contact, and being connected at the opposite end for movement with the boom truck in directions toward and from a remote contacting position with said transverse member, means connected to move said boom truck and element in the directions described, a hoisting device with which to suspend loads from the boom element, and a carrying trolley therefor having rollers in continuous rolling engagement with the boom element and having suspended vertical-swivel means mounting the hoisting device in a suspended swiveled position for turning about a vertical axis.

9. For use in combination with a straight length of transversely disposed, boom supporting rail member, suspended, longitudinally extending crane structure including a boom truck carrying rollers for rolling endwise longitudinally thereof, a boom element having an end portion which, as said element extensibly longitudinally moves, overlaps with said transverse boom supporting member in solid physical contact, and being connected at the opposite end for movement with the boom truck in directions toward and from a remote contacting position with said transverse member, means connected to move said boom truck and element in the directions described, said structure characterized by a hoisting device with which to suspend loads from the boom element, and a carrying trolley therefor having rollers in continuous rolling engagement with the boom element and having suspended vertical-swivel means mounting the hoisting device in a suspended swiveled position for turning about a vertical axis, said structure further characterized wherein said boom element and said transverse boom supporting member physically contact as aforesaid incident to closing a predetermined vertical clearance gap due to the shifting weight of the loaded trolley as it rolls on the boom element, and wherein the boom element carries anti-friction roller means establishing a rolling contact of engagement with the straight length of said transverse member.

References Cited in the file of this patent

UNITED STATES PATENTS

| | | |
|---|---|---|
| 82,774 | Weed | Oct. 6, 1868 |
| 627,890 | Babcock | June 27, 1899 |
| 655,522 | Seavers | Aug. 7, 1900 |
| 1,436,171 | Hirt | Nov. 21, 1922 |
| 1,460,323 | Hodges | June 26, 1923 |
| 2,284,238 | Todd | May 26, 1942 |
| 2,355,863 | Harris | Aug. 15, 1944 |
| 2,414,301 | Harris | Jan. 14, 1947 |
| 2,589,954 | Neil | Mar. 18, 1952 |
| 2,704,037 | Babcock | Mar. 15, 1955 |
| 2,765,928 | Remenschneider | Oct. 9, 1956 |